(12) United States Patent
Hentschel et al.

(10) Patent No.: US 7,025,108 B2
(45) Date of Patent: Apr. 11, 2006

(54) METHOD FOR MILLING CASTING MOULDS

(75) Inventors: Bertram Hentschel, Tresbsen (DE); Reso Alijew, Freiberg (DE); Detlev Gantner, Freiberg (DE)

(73) Assignee: Actech GmbH Advanced Casting Technologies, Freiberg (DE)

( * ) Notice: Subject to any disclaimer, the term of this patent is extended or adjusted under 35 U.S.C. 154(b) by 0 days.

(21) Appl. No.: 10/490,774

(22) PCT Filed: Sep. 21, 2002

(86) PCT No.: PCT/DE02/03555

§ 371 (c)(1),
(2), (4) Date: Jul. 9, 2004

(87) PCT Pub. No.: WO03/028931

PCT Pub. Date: Apr. 10, 2003

(65) Prior Publication Data

US 2004/0238144 A1     Dec. 2, 2004

(30) Foreign Application Priority Data

Sep. 27, 2001   (DE) ................................ 101 47 843
Sep. 10, 2002   (DE) ................................ 102 42 191

(51) Int. Cl.
*B22C 9/00*     (2006.01)
(52) U.S. Cl. ................... 164/17; 164/4.1; 164/456
(58) Field of Classification Search ............. 164/17, 164/161, 4.1, 456
See application file for complete search history.

(56) References Cited

U.S. PATENT DOCUMENTS

| 4,620,824 | A  | * | 11/1986 | Eckstein et al. ............ 409/233 |
| 5,345,052 | A  | * | 9/1994  | Puddephatt ............... 219/69.17 |
| 6,254,321 | B1 | * | 7/2001  | Lind ......................... 409/136 |
| 6,286,581 | B1 | * | 9/2001  | Gustafson .................... 164/17 |
| 6,564,852 | B1 | * | 5/2003  | Wendt et al. ................. 164/17 |

FOREIGN PATENT DOCUMENTS

DE           195 44 573 C1     9/1996

\* cited by examiner

*Primary Examiner*—Kevin Kerns
*Assistant Examiner*—I.-H. Lin
(74) *Attorney, Agent, or Firm*—Edwards Angell Palmer & Dodge LLP

(57) ABSTRACT

The invention relates to a method for producing heat-resistant casting molds from molding sand containing binder, particularly for producing an inner contour of casting molds for prototypes, large volumes and deep grooves often being produced especially in the machining of molds for rapid production of prototypes from casting materials. To increase efficiency, in a first step blocks of molding material are produced whose dimensions correspond to a mold cavity depth typically of 300 mm to 400 mm. The inner contour of the mold is then produced oversized with spacing close to the contour of the inner wall of the mold cavity by means of a roughing tool (4) that has an effective cutting diameter of 12 mm to 35 mm. The mold cavity is then machined by fast milling away of the oversize material following the contour, with a finishing cutter (3) that has a diameter-to-length ratio between 1:10 and 1:30.

8 Claims, 2 Drawing Sheets

METHOD FOR MILLING CASTING MOULDS

CROSS-REFERENCE TO RELATED APPLICATION

This application is a 371 of PCT/DE02/03555 filed on Sept. 21, 2002.

1. Field of the Invention

This invention relates to a method and a tool for producing heat-resistant casting molds from mold materials, especially from molding sand containing a binder, or for producing an inner contour of patterns or prototypes consisting of plastic, graphite, wood materials, or other millable materials; large volumes and deep grooves are often produced, especially in the machining of molds for rapid production of prototypes from casting materials.

2. Background of the Invention

According to the prior art described in DE 195 44 573 C1, a finishing technique that permits a choice of standard tools is necessary for the production of casting molds with deep grooves. DE 195 44 573 C1 proceeds from the concepts that plate-like cast blanks with given, optionally variable, wall thicknesses are connected flush to one another in succession with a base structure or with a previously machined blank, and are then machined upward from their downward-pointing faces with milling tools pointing upward from the bottom, depending on the NC program for the layer to be machined off in each case. Production therefore occurs successively from plate-like layers of material. Since relatively thin layers of the same type always have to be machined, the milling data can be optimized for a given material. In particular, the same milling parameters always result for given layer thicknesses for the same material.

The use of adhesive and the additional expense for joining the layers in order to avoid incremental errors in building up the layers are drawbacks. The free face surface is brought to a prescribed spacing dimension with a surface miller before or after any contour machining operation. Support areas are necessary on the outer edge to provide that the next blank can be oriented and joined to the previously machined blank exactly in the joining plane.

When using standard milling tools, the advantages of high-speed machining are partly lost again in this way. Standard milling tools usually include a ball end with a diameter of 6 mm and a salient length of 24 mm at the most. This results in a diameter-to-length ratio of from 1:4 to a maximum of 1:8. Machining in individual layers necessarily results from this relatively small diameter-to-length ratio.

Since very high surface qualities can be produced by high-speed machining in mold-making, subsequent fine-machining procedures can be completely or partly omitted in many cases. Surfaces can be produced that satisfy the required final accuracy of dimensional and shape tolerances as well as surface quality. Productive high-speed machining time in mold-making can be reduced considerably by higher feed rates, especially in case of complicated molds. Surface roughness with a ball-head mill is determined by the given tool diameter. A small edge radius can be produced by a toroidal cutter, but this has substantially larger dimensions and greater weight because of the clamping units for the indexable inserts.

On the other hand, the cutting speeds with high-speed machining are 5–10 times as high as in the conventional range, which results in raised requirements for the milling tools used. Milling tools for high-speed machining are subject to high centrifugal loads. Tool imbalance, which is of subordinate importance in conventional machining, also has to be considered with high circumferential speeds. Forces can be produced by tool imbalance at high speeds of rotation that are greater than the actual cutting forces. For this reason, use in high-speed machining is restricted by structural design, especially when indexable inserts are present. Rising tool costs occur with increasing cutting speeds, caused by high temperatures and severe abrasive wear.

It has been found in practice that no satisfactory results can be produced with the standard milling tools mentioned initially. This is primarily because of the loads on the tool occurring at high frequencies of rotation from centrifugal forces. While balanced solid tools as a rule show non-critical behavior, tools with indexable inserts with high weights and large diameters especially are not a match for the centrifugal forces in their form up to now. Against this background, suitable tools are necessary for high-speed machining.

This invention seeks to provide a method and tools with which efficiency can be increased in the production of heat-resistant casting molds made of mold material, especially molding sand containing binder, or in the production of patterns or prototypes made of plastic, graphite, wood materials, or other millable materials with deep grooving.

SUMMARY OF THE INVENTION

The invention provides a method for producing heat-resistant casting molds from mold materials, especially from molding sand containing binder, or for producing an inner contour of patterns or prototypes made of plastic, graphite, wood materials, or other millable materials, characterized by the following steps: a) preparation of blocks of mold material from mold materials, especially from molding sand containing binder, plastic, graphite, wood materials, or other millable materials with a dimension that typically corresponds to a mold cavity depth of up to 300 mm to 400 mm; b) machining out the inner contour of the mold by rough milling, oversized with spacing close to the inner wall of the mold cavity, with a high feed rate with a milling tool operated with a high-frequency spindle at high speeds of rotation, in the form of a roughing tool (4) with an effective cutting diameter of 12 mm to 35 mm; c) finish-milling the mold cavity by fast millingaway of the oversize material following the contour, with a milling tool in the form of a finishing cutter (3) by means of a high-frequency spindle driven at high speeds of rotation, with a smaller effective tool diameter than the roughing tool (4) and a diameter-to-length ratio between 1:10 and 1:30, preferably between 1:13 and 1:25; and d) after treatment of the surface of the mold material, optionally by coating and smoothing the mold cavity with mold release compound. Steps b and c preferably are performed in a chuck and all mold elements are machined jointly.

Also provided is a milling tool in the form of a roughing tool (4) or of a finishing cutter (3) for producing heat-resistant casting molds made of mold material, especially of molding sand containing binder, or for producing patterns or prototypes made of plastic, graphite, wood materials, or other millable materials, characterized by a rotationally symmetrical tool shaft (7) designed and balanced as a thin-walled sleeve body, that has at the front end a cutting head (11) with one or more cutting tips (9) or blade-like inserts, and that is provided at the opposite end of the shaft with a clamping shaft (6).

Preferred milling tools can include one or more of the following features:

i. the clamping shaft (6) for clamping in the tool holder of a motor spindle is designed as a clamping shaft (6) with a smooth cylindrical shaft in the outer surface area, and in the area of the inner surface is provided with and strengthened by a shaft body (12) inserted by press-fitting;

ii. the shaft body (12) is provided with an adapter shaft (8) extending beyond the tool shaft (7) and fitting the tool holder of a motor spindle;

iii. the wall thickness of the tool shaft (7) is designed with a reducing taper toward the front end (13) along its axis of rotation, with the taper of the tool shaft (7) being such that the diameter of the cutting circle of the cutting body is larger than the maximum outside diameter of the tool shaft (7) in the area of the shaft body (12) with the adapter shaft (8);

iv. the tool shaft (7) has a cylindrical outer surface with a constant outside diameter, and has a non-cylindrical, conical or gradually expanding inner surface at least in the area between the clamping shaft (6) and the front end (13), the expansion of the sleeve being smaller in the area of the clamping shaft (6) than in the area of the front end (13);

v. the cutting head (11) has at least one cutting tip (9), cut out of hard metal plates, that is arranged in a positive-locking or force-fitting manner in a slot (14) provided at the end of the tool shaft (7);

vi. in a roughing tool (4), the cutting circle diameter of the cutting tip (9) is 12 to 40 mm, preferably 30 to 35 mm, and the tool shaft (7) has a diameter-to-length ratio between 1:3.5 and 1:11;

vii. the milling tool has an effective cutting diameter of 40 mm to 90 mm, preferably between 50 mm and 80 mm, depending on the binder content of the molding sand; and/or viii. the diameter of the cutting circle of the cutting tip (9) is 6 mm to 12 mm, preferably 8 mm to 10 mm, and the tool shaft (7) has a diameter-to-length ratio between 1:10 and 1:30, preferably between 1:13 and 1:25.

With the proposed method, casting molds can be produced with low production costs and rapid production times by direct mold material milling. Complete machining of the casting mold in a mount is possible with long-salient milling tools, which makes possible rapid production of molds, patterns, and prototypes without layerwise cementing. The accuracy of the overall mold can thereby be increased substantially in a previously unknown manner. Furthermore, the cutting blades of the milling tools can be designed with small corner radii so that complicated contours can be reproduced in the casting molds with greatest accuracy. The tool shaft has a high slenderness ratio. Even complicated contours in small deep-lying areas of the mold, which otherwise are inaccessible for conventional tools, can be produced with this feature of the milling tool. Maximum cutting speeds with high feed rates are made possible by the use of modem cutting materials, and are reflected in distinct shortening of production time and improvement of surface quality.

The invention will be described below in further detail with reference to an example of embodiment and to the drawings.

DETAILED DESCRIPTION OF THE INVENTION

Figure 1:
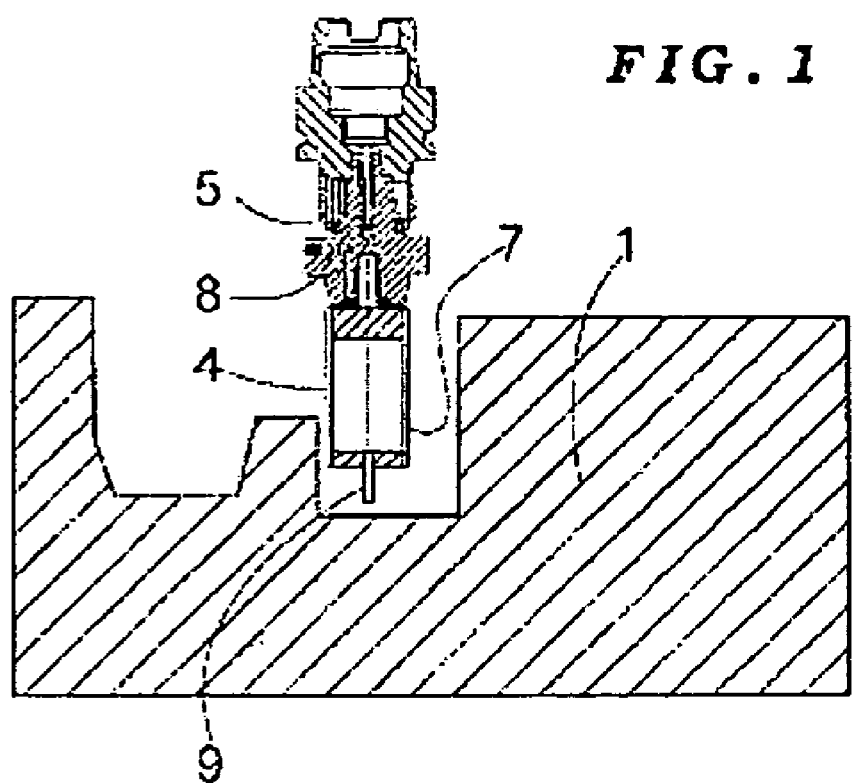
FIG. 1—illustrates a substep of the method by machining the casting mold by rough milling, FIG. 2—illustrates machining the casting mold with a finishing cutter, FIG. 3—illustrates a finishing cutter with a force-fit cutting tip, FIG. 4—illustrates a finishing cutter with a positively locked cutting tip, FIG. 5—illustrates a roughing cutter with force-fit cutting tip, and FIG. 6—illustrates a roughing cutter with a positively locked cutting tip.
Figure 2:
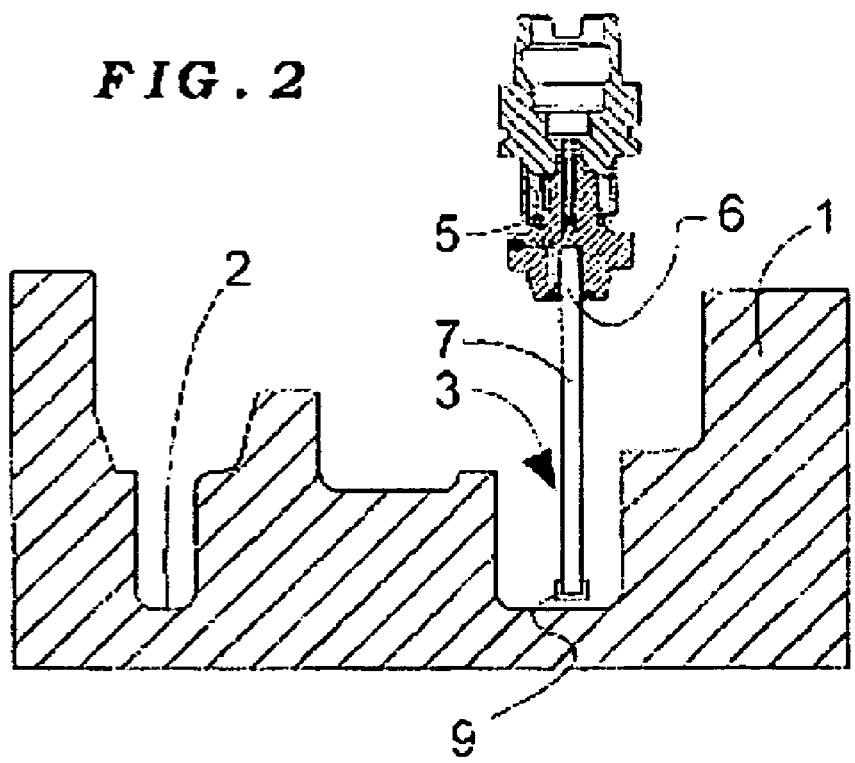

FIG. 1 shows a block of mold material that is to be machined as part of a casting mold 1 with deep contours 2. The deep contours 2 are shown in FIG. 2. Casting mold 1 means heat-resistant casting molds made of a mold material, especially of molding sand containing binder, or patterns or prototypes made of plastic, graphite, wood materials, or other millable materials. Another field of use, for example, is the production of graphite electrodes. The term "casting mold 1" will be used below.

The casting mold 1 as a rule consists of at least two mold halves, or of plural mold parts, which are assembled, together with the cores customary in foundry practice, to make a complete mold. To produce a casting mold 1, a block is first made of mold material consisting of a mold material or molding sand containing binder, whose dimensions as a rule conform to half a casting mold. The height of the casting mold 1 and thus the thickness of the block of mold material is determined essentially by the salient length of the milling tool with which the deep contours 2 are to be machined. The deep contours 2 are machined with the finishing cutter 3 illustrated in FIG. 2, which should have a maximum salient length between 300 and 400 mm. In this way, the mold cavity can have a depth of up to 400 mm, and assembling of individual casting mold layers by cementing can be avoided. However, the method cannot be limited to producing casting mold halves. Instead, by means of the method, individual blocks of mold material can be machined to the given dimensions and assembled into larger casting molds 1.

The machining of casting molds 1 is generally subdivided into roughing and finishing the geometry. Because of the different requirements of the two substeps, special procedures are advisable for roughing and for finishing.

The purpose of roughing is the economical and rapid machining of a large volume of material to approximate the shape for the subsequent finishing process. According to FIG. 1, the inner contour of the casting mold 1 is first machined out oversized with a milling tool in the form of a roughing tool 4, with contour-fitted clearance from the contour of the inner wall of the mold cavity. By careful roughing matching the geometry, performed with the roughing tool 4 with a large feed and at a high cutting speed, the finishing process can be reduced to a minimal necessary dimension.

The milling tools are driven at high speeds of rotation with a high-frequency spindle, which is not further shown. The milling tools are held by a clamping chuck 5 that has high tool mount stiffness and high system damping. Press-shrunk or hot-shrunk clamping systems are suitable for this. Clamping systems with high vibrational damping are preferred, because deficient vibrational damping can have negative effects on tool life.

On the other hand, clamping chucks 5 that have a slender tool mount are preferred for the finishing cutter 3 shown in FIG. 2, in order to provide optimal conditions for milling in casting mold regions that are difficult to access. Very rigid clamping systems can be used for rough milling, to absorb high cutting and transverse forces. The clamping function as a rule is based on the elastic deformation of the tool mount. In contrast to this, collet chucks can be used in the same way, but they are provided with movable parts compared to forced clamp and hot-shrink technology. Symmetrical construction and optimal balancing are important for the choice of clamping means as prerequisites for high-precision concentricity and improvement of milling results. In the case of collet chuck mounts, the end area of the shaft can be fastened directly in the collet with the clamping shaft 6 of the tool shaft 7, while in the case of force-shrink or hot-shrink technology, the placement of an adapter shaft 8 according to FIG. 1 extending beyond the tool shaft 7 and fitting in the tool holder is provided for.

The block of mold material in FIG. 1 is milled with a roughing tool 4 with an effective cutting diameter of 12 to 40 mm. The cutting diameter should preferably be 30 to 35 mm for the production of the casting mold 1 to be economical. The shaft diameter in this way is substantially greater than the shaft diameter for a finishing cutter 3. This can be attributed to the fact that the outside diameter of the tool shaft 7 is related to the bending stress on the cutting tip 9, which depends on the free clamped length of the cutting tip 9.

Rough milling is followed by finish milling of the mold cavity with a finishing cutter 3 that is shown in FIG. 2. Rapid contour-tracing milling off of the oversize material is done during finish milling with the finishing cutter 3, which is clamped in one of the clamping holders described above and is driven at high speeds of rotation.

In addition, the finish-milling may include milling of molds with or without draft, as well as prefinishing and smoothing. For smoothing, a finishing cutter 3 with a smaller effective tool diameter than the roughing tool 4 is used, which has a diameter-to-length ratio between 1:10 and 1:30, preferably between 1:13 and 1:25, and which is described further below in detail. Finally, the casting mold 1 is subjected to aftertreatment, by which the surface of the mold material is sealed by coating and the mold cavity is smoothed by applying a mold release compound and made ready for assembly and the casting process.

According to FIGS. 3 to 6, the milling tools necessary for high-speed milling in the form of a roughing tool 4 or a finishing cutter 3 are characterized with regard to their common features by a thin-walled sleeve body that constitutes the tool shaft 7. This tool shaft 7 is balanced and is of rotationally symmetrical design to avoid imbalance. The end of the tool shaft 7 is provided with a cutting head 11 with one or more cutting tips 9 or blade-like inserts. At the opposite end, the tool shaft 7 has a clamping shaft 6 with a smooth cylindrical shaft on the outer surface, which can be fastened with adequate firmness to a motor spindle by means of a collet chuck.

When using the force-shrink technique, for example, and to increase rigidity, the clamping shaft 6 is provided on the inside surface with, and strengthened by, a shaft body 12 inserted by press-fitting. The clamping shaft 6 can thus be held directly in a collet chuck 5. To match the diameter of the tool shaft 7 to the given dimensions of the collet chuck 5, an adapter shaft 8 fitted to the tool holder of a motor spindle can be provided, which extends beyond the tool shaft 7 with the shaft body 12. This permits the use of milling tools that can be adapted to a given collet chuck 5 and have tool shafts 7 of different outside diameters suited to the particular machining task.

Figure 5:
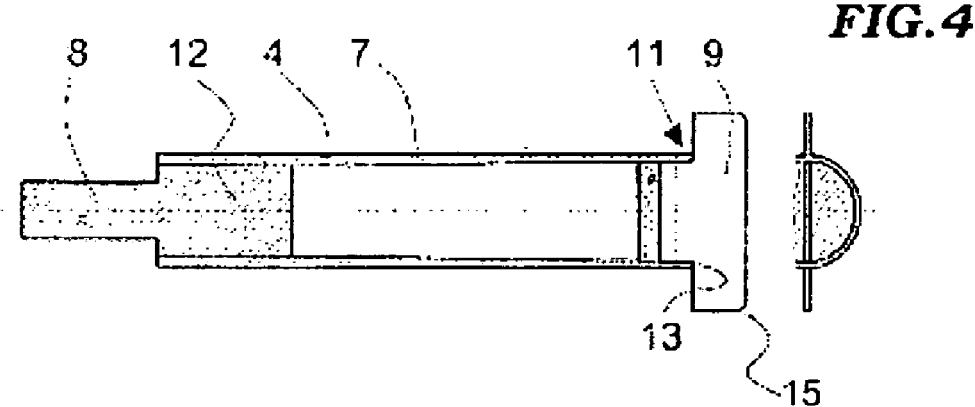
Figure 6:
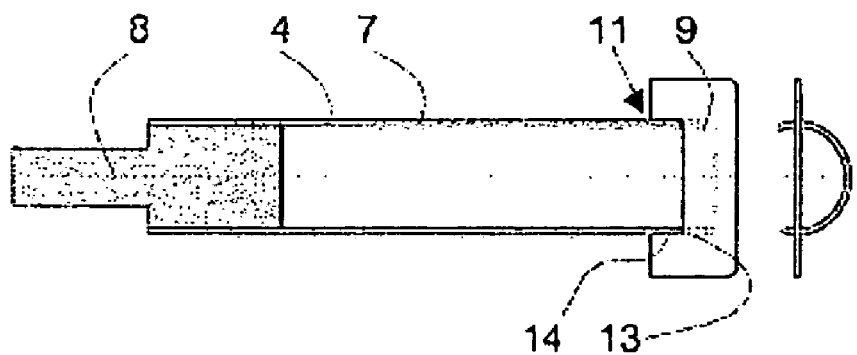

To reduce the increased weight caused by increasing the shaft diameter, the wall thickness of the tool shaft 7 according to FIG. 5 can be tapered along its axis of rotation toward the front end. The taper of the tool shaft 7 is designed so that the diameter of the cutting circle of the cutting tip 9 is greater than the maximum outside diameter of the tool shaft 7 in the area of the shaft body 12 with the adapter shaft 8. The wall thickness can basically be tapered in by means of a conically extending or otherwise graduated outer surface with a constant inside diameter, which can be produced simply and accurately.

On the other hand, functional characteristics can be raised by a tool shaft 7 that has a cylindrical outer surface with constant outside diameter and a non-cylindrical, conical or gradually expanding inner surface at least in the area between the clamping shaft 6 and the front end 13. The widening of the sleeve in this case is smaller in the area of the clamping shaft 6 than in the area of the front end 13. The advantage of the proposed method is considerably lower weight of the tool shaft 7 in the area of the cutting head 11.

The cutting head 11 has, for example, cutting tips 9 cut from hard metal plates, which are connected to the front end of the tool shaft 7 by means of a slot 14 by force-fitting or positive fitting. The cutting tips 9 can be coated or made of fast-cutting steel, or can be ceramic or cement. The cutting tips 9 can be cut from a plate of material from about 1 mm to 3 mm thick by wire erosion. The clamping contour of the cutting tips 9 is governed by the fastening method. The economy of the method can be further affected positively by the design and arrangement of the cutting tips 9.

Figure 3:
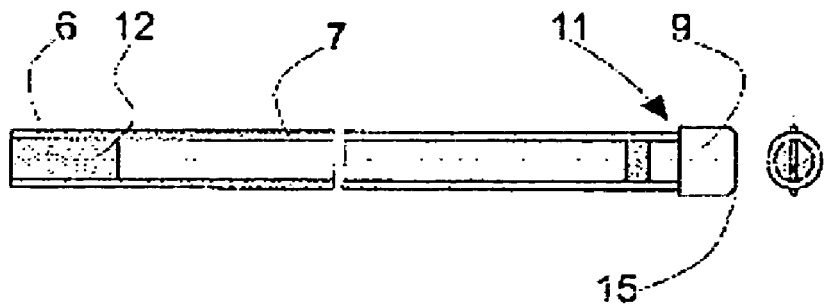

A smoothing cutter 3, as shown in FIG. 3, has a cutting tip 9 with a cutting circle 6 mm to 12 mm in diameter. The diameter of the cutting circle is preferably 8 mm to 10 mm. The corner radius 15 is 1 mm to half the diameter, which makes possible even castings with a small outer edge radius. The cutting tip 9 is fastened in the cutting head 11 by positive-fitting clamping, for example by shrinkage, the mounting expenditure for replacing the cutting head 9 being small, given the simple handling. The tool shaft 7 has a diameter-to-length ratio that is between 1:10 and 1:30, preferably between 1:13 and 1:25.

Figure 4:
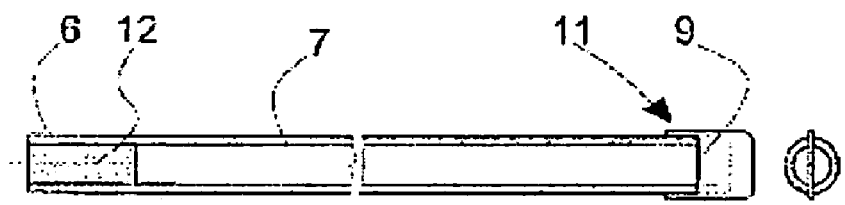

According to FIG. 4, concentricity and vibrational damping in the cutting tip 9 can be increased if the cutting tip 9 is partially mounted in a slot 14 provided diametrically in the front end 13 of the tool shaft 7. The cutting tip 9 is force-fitted in the slot 14 and firmly secured, whereby the free salient length is reduced. The accuracy of concentricity can be further increased by the conical configuration of the tool shaft 7 shown in FIG. 5. Besides these geometry-dependent advantages, another benefit results from a higher tool life of the cutting tip 9.

In a roughing tool 4 according to FIG. 5, the free clamping length of the cutting tip 9 is reduced by a tool shaft 7 that is slightly smaller than the diameter of the cutting circle of the cutting tip 9. Depending on the plate thickness of the cutting tip 9, the diameter of the tool shaft 7 can be 4 mm to 8 mm smaller than the diameter of the cutting circle of the cutting tip 9. The diameter of the cutting circle of the cutting tip can be 12 mm to 40 mm, preferably 30 mm to 35 mm. The tool shaft 7 should have a diameter-to-length ratio between 1:3.5 and 1:11. In case of a cutting tip 9 force-fitted in a slot 14 according to FIG. 6, the shaft diameter chosen can be about 4 mm smaller.

The invention claimed is:
1. A method for producing heat-resistant casting molds from molding sand containing binder, the method comprising:
   a) preparing blocks of mold material from molding sand containing binder with a dimension that corresponds to a mold cavity depth of up to about 300 mm to about 400 mm;
   b) machining out the inner contour of the block by high speed rough milling, oversized with spacing close to the inner wall of the mold cavity, with a high feed rate with a roughing tool that is driven with a high-frequency spindle at high speeds of rotation and comprises a balanced, rotationally symmetrical tool shaft realized as a bending resistant thin-walled tube or sleeve body, that has at the front end a cutting head and is provided at the opposite end of the shaft with a clamping shaft, said cutting head comprising at least one cutting tip, cut out of hard metal plates, that is arranged in a positive-locking or force-fitting manner in a slot provided at the front end of the tool shaft, the effective cutting diameter of said cutting tip being about 12 to about 40 mm, and said tool shaft having a diameter-to-length ratio between about 1:3.5 and about 1:11, thereby providing a mold cavity;
   c) finish-milling the mold cavity by high speed milling, by removing the oversize material following the contour with a finishing cutter driven at high speeds of rotation by means of the high-frequency spindle and comprising a balanced, rotationally symmetrical tool shaft realized as a bending resistant thin-walled tube or sleeve body, which has at the front end a cutting head and is provided at the opposite end of the shaft with a clamping shaft, said cutting head comprising at least one cutting tip, cut out of hard metal plates, that is arranged in a positive-locking or force-fitting manner in a slot provided at the front end of the tool shaft, the effective cutting diameter of said cutting tip being smaller than that of said roughing tool and said tool shaft having a diameter-to-length ratio between about 1:10 and about 1:30; and
   d) performing aftertreatment of the surface of the mold material, wherein the aftertreatment step comprises coating and smoothing the mold cavity with mold release compound.

2. The method according to claim 1, wherein the effective cutting diameter of said cutting tip of the roughing cutter is about 30 to 35 mm.

3. The method according to claim 1, wherein the tool shaft of the finishing cutter has a diameter-to-length ratio between about 1:13 and about 1:25 wherein the tool shaft is realized as a bending resistant thin-walled tube or sleeve body.

4. The method pursuant to claim 1, wherein steps b) and c) are performed with the block of mold material in a chuck, with the use of a roughing tool or a finishing cutter, as the case may be, wherein the clamping shaft for clamping in the tool holder of a motor spindle comprises a clamping shaft with a smooth cylindrical shaft in the area of the outer surface, and in the area of the inner surface comprises a strengthening shaft body inserted by press-fitting.

5. The method pursuant to claim 4, wherein step b) comprises using a roughing tool wherein the clamping shaft for clamping in the tool holder of a motor spindle comprises a smooth cylindrical shaft in the area of the outer surface, and in the area of the inner surface comprises a strengthening shaft body inserted by press-fitting, said shaft body further comprising an adapter shaft extending beyond the tool shaft and fitting the tool holder of a motor spindle.

6. The method pursuant to claim 5, wherein step b) comprises using of a roughing tool wherein the wall thickness of the tool shaft, realized as a bending resistant thin-walled tube or sleeve body, being comprises a reducing taper toward the front end along its axis of rotation, with the taper of the tool shaft being such that the diameter of the cutting circle of the cutting body is larger than the maximum outside diameter of the tool shaft in the area of the shaft body with the adapter shaft.

7. The method pursuant to claim 5, wherein step b) comprises using a roughing tool wherein the tool shaft, realized as a bending resistant thin-walled tube or sleeve body, comprises a cylindrical outer surface with a constant outside diameter, and having a non-cylindrical, conical or gradually expanding inner surface at least in the area between the clamping shaft and the front end, whereby the expansion of the sleeve is smaller in the area of the clamping shaft than in the area of the front end.

8. A method for producing heat-resistant casting molds from molding sand containing binder, the method comprising:
   a) preparing blocks of mold material from molding sand containing binder with a dimension that corresponds to a mold cavity depth of up to about 300 mm to about 400 mm;
   b) machining out the inner contour of the block by high speed rough milling, oversized with spacing close to the inner wall of the mold cavity, with a high feed rate with a roughing tool that is driven with a high-frequency spindle at high speeds of rotation and comprises a balanced, rotationally symmetrical tool shaft realized as a bending resistant thin-walled tube or sleeve body, that has at the front end a cutting head and is provided at the opposite end of the shaft with a clamping shaft, said cutting head comprising at least one cutting tip, cut out of hard metal plates, that is arranged in a positive-locking or force-fitting manner in a slot provided at the front end of the tool shaft, the effective cutting diameter of said cutting tip being about 40 to 90 mm, thereby providing a mold cavity;
   c) finish-milling the mold cavity by high speed milling, by removing the oversize material following the contour with a finishing cutter driven at high speeds of rotation by means of the high-frequency spindle and comprising a balanced, rotationally symmetrical tool shaft realized as a bending resistant thin-walled tube or sleeve body, which has at the front end a cutting head and is provided at the opposite end of the shaft with a clamping shaft, said cutting head comprising at least one cutting tip, cut out of hard metal plates, that is arranged in a positive-locking or force-fitting manner in a slot provided at the front end of the tool shaft, the effective cutting diameter of said cutting tip being smaller than that of said roughing tool and said tool shaft having a diameter-to-length ratio between about 1:10 and about 1:30; and
   d) performing aftertreatment of the surface of the mold material, wherein the aftertreatment step comprises coating and smoothing the mold cavity with mold release compound.

* * * * *